(12) United States Patent
Murari et al.

(10) Patent No.: US 11,892,739 B2
(45) Date of Patent: Feb. 6, 2024

(54) ELECTROPHORETIC DISPLAY LAYER WITH THIN FILM TOP ELECTRODE

(71) Applicant: E INK CORPORATION, Billerica, MA (US)

(72) Inventors: Nishit Murari, Billerica, MA (US); Pavel Kamaev, Lexington, MA (US); David Darrell Miller, Wakefield, MA (US); Richard J. Paolini, Jr., Framingham, MA (US); Jay William Anseth, Canton, MA (US)

(73) Assignee: E Ink Corporation, Billerica, MA (US)

( * ) Notice: Subject to any disclaimer, the term of this patent is extended or adjusted under 35 U.S.C. 154(b) by 376 days.

(21) Appl. No.: 17/167,387

(22) Filed: Feb. 4, 2021

(65) Prior Publication Data

US 2021/0247656 A1 Aug. 12, 2021

Related U.S. Application Data

(60) Provisional application No. 62/971,285, filed on Feb. 7, 2020.

(51) Int. Cl.
*G02F 1/167* (2019.01)
*G02F 1/16757* (2019.01)

(52) U.S. Cl.
CPC .......... *G02F 1/167* (2013.01); *G02F 1/16757* (2019.01)

(58) Field of Classification Search
CPC ............. G02F 1/167; G02F 2001/1678; G02F 1/16756; G02F 1/16757; G02F 1/136227; G02F 1/16766; G02F 2201/50; G02F 1/1681; G02F 2201/123; G02F 2202/28; G02F 1/1676; G02F 1/1679; G02F 1/1685; G02F 1/172; G02F 1/1303; G02F 1/1333; G02F 1/133345; G02F 1/133348; G02F 1/133377; G02F 1/1368; G02F 1/1677; G02F 2202/36; G02F 2202/42; G02F 2203/01; G02F 2203/055; G02F 2203/34; G02F 1/1339; G02F 1/134363;
(Continued)

(56) References Cited

U.S. PATENT DOCUMENTS

| 4,418,346 A | 11/1983 | Batchelder |
| 5,872,552 A | 2/1999 | Gordon, II et al. |

(Continued)

FOREIGN PATENT DOCUMENTS

| CN | 102253502 A | 11/2011 | |
| KR | 20120007200 | * 1/2012 | ............. G02F 1/167 |

(Continued)

OTHER PUBLICATIONS

Korean Intellectual Property Office, "International Search Report and Written Opinion", PCT/US2021/016552, dated Jun. 2, 2021.

*Primary Examiner* — Brandi N Thomas
(74) *Attorney, Agent, or Firm* — Brian D. Bean

(57) ABSTRACT

A method for making electrophoretic displays layers including various thin films that are deposited directly onto a layer of microcapsules of electrophoretic media. In an embodiment, a thin film of a light-transmissive conductive material is deposited to create a clear front electrode for an electrophoretic display. In some embodiments, both a dielectric layer and a thin film of a light-transmissive conductive material will be deposited onto the microcapsules.

8 Claims, 9 Drawing Sheets

(58) Field of Classification Search
CPC .......... G02F 1/1347; G02F 1/136213; G02F 1/1675; G02F 1/16762; G02F 2201/42; G02F 2201/54; G02F 2202/01; H01L 21/56; H01L 23/295; H01L 23/3121; H01L 23/49586; H01L 23/293; H01L 21/02178; H01L 21/02197; H01L 21/0228; H01L 21/02282; H01L 21/31691; H01L 27/101; H01L 27/1255; H01L 28/55; H01L 31/022466; H01L 31/022475; H01L 31/0236; C25D 13/02; C25D 13/22; C25D 5/50; C25D 13/12
See application file for complete search history.

(56) References Cited

U.S. PATENT DOCUMENTS

| | | |
|---|---|---|
| 6,124,851 A | 9/2000 | Jacobson |
| 6,130,773 A | 10/2000 | Jacobson et al. |
| 6,130,774 A | 10/2000 | Albert et al. |
| 6,144,361 A | 11/2000 | Gordon, II et al. |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,252,564 B1 | 6/2001 | Albert et al. |
| 6,271,823 B1 | 8/2001 | Gordon, II et al. |
| 6,312,304 B1 | 11/2001 | Duthaler et al. |
| 6,312,971 B1 | 11/2001 | Amundson et al. |
| 6,376,828 B1 | 4/2002 | Comiskey |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,480,182 B2 | 11/2002 | Turner et al. |
| 6,498,114 B1 | 12/2002 | Amundson et al. |
| 6,506,438 B2 | 1/2003 | Duthaler et al. |
| 6,518,949 B2 | 2/2003 | Drzaic |
| 6,521,489 B2 | 2/2003 | Duthaler et al. |
| 6,535,197 B1 | 3/2003 | Comiskey et al. |
| 6,545,291 B1 | 4/2003 | Amundson et al. |
| 6,639,578 B1 | 10/2003 | Comiskey et al. |
| 6,639,580 B1 | 10/2003 | Kishi et al. |
| 6,657,772 B2 | 12/2003 | Loxley |
| 6,664,944 B1 | 12/2003 | Albert et al. |
| D485,294 S | 1/2004 | Albert |
| 6,680,725 B1 | 1/2004 | Jacobson |
| 6,683,333 B2 | 1/2004 | Kazlas et al. |
| 6,724,519 B1 | 4/2004 | Comiskey et al. |
| 6,750,473 B2 | 6/2004 | Amundson et al. |
| 6,816,146 B2 | 11/2004 | Harada et al. |
| 6,816,147 B2 | 11/2004 | Albert |
| 6,819,471 B2 | 11/2004 | Amundson et al. |
| 6,825,068 B2 | 11/2004 | Denis et al. |
| 6,825,829 B1 | 11/2004 | Albert et al. |
| 6,831,769 B2 | 12/2004 | Holman et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,862,129 B2 | 3/2005 | Matsuda et al. |
| 6,865,010 B2 | 3/2005 | Duthaler et al. |
| 6,922,276 B2 | 7/2005 | Zhang et al. |
| 6,950,220 B2 | 9/2005 | Abramson et al. |
| 6,967,640 B2 | 11/2005 | Albert et al. |
| 6,980,196 B1 | 12/2005 | Turner et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,030,412 B1 | 4/2006 | Drzaic et al. |
| 7,075,502 B1 | 7/2006 | Drzaic et al. |
| 7,075,703 B2 | 7/2006 | O'Neil et al. |
| 7,106,296 B1 | 9/2006 | Jacobson |
| 7,110,163 B2 | 9/2006 | Webber et al. |
| 7,116,318 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,190,008 B2 | 3/2007 | Amundson et al. |
| 7,202,992 B2 | 4/2007 | Kawai |
| 7,206,119 B2 | 4/2007 | Honeyman et al. |
| 7,223,672 B2 | 5/2007 | Kazlas et al. |
| 7,230,751 B2 | 6/2007 | Whitesides et al. |
| 7,236,292 B2 | 6/2007 | LeCain |
| 7,256,766 B2 | 8/2007 | Albert et al. |
| 7,259,744 B2 | 8/2007 | Arango et al. |
| 7,271,947 B2 | 9/2007 | Liang et al. |
| 7,280,094 B2 | 10/2007 | Albert |
| 7,312,784 B2 | 12/2007 | Baucom et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,382,363 B2 | 6/2008 | Albert et al. |
| 7,388,572 B2 | 6/2008 | Duthaler et al. |
| 7,411,719 B2 | 8/2008 | Paolini, Jr. et al. |
| 7,420,549 B2 | 9/2008 | Jacobson et al. |
| 7,442,587 B2 | 10/2008 | Amundson et al. |
| 7,443,571 B2 | 10/2008 | LeCain et al. |
| 7,453,445 B2 | 11/2008 | Amundson |
| 7,492,497 B2 | 2/2009 | Paolini, Jr. et al. |
| 7,513,813 B2 | 4/2009 | Paolini, Jr. et al. |
| 7,535,624 B2 | 5/2009 | Amundson et al. |
| 7,551,346 B2 | 6/2009 | Fazel et al. |
| 7,554,712 B2 | 6/2009 | Patry et al. |
| 7,561,324 B2 | 7/2009 | Duthaler et al. |
| 7,583,427 B2 | 9/2009 | Danner et al. |
| 7,598,173 B2 | 10/2009 | Ritenour et al. |
| 7,605,799 B2 | 10/2009 | Amundson et al. |
| 7,636,191 B2 | 12/2009 | Duthaler et al. |
| 7,649,666 B2 | 1/2010 | Isobe et al. |
| 7,649,674 B2 | 1/2010 | Danner et al. |
| 7,667,886 B2 | 2/2010 | Danner et al. |
| 7,672,040 B2 | 3/2010 | Sohn et al. |
| 7,679,814 B2 | 3/2010 | Paolini, Jr. et al. |
| 7,688,497 B2 | 3/2010 | Danner et al. |
| 7,728,811 B2 | 6/2010 | Albert et al. |
| 7,729,039 B2 | 6/2010 | LeCain et al. |
| 7,733,335 B2 | 6/2010 | Zehner et al. |
| 7,785,988 B2 | 8/2010 | Amundson et al. |
| 7,791,782 B2 | 9/2010 | Paolini, Jr. et al. |
| 7,826,129 B2 | 11/2010 | Wu et al. |
| 7,839,564 B2 | 11/2010 | Whitesides et al. |
| 7,843,621 B2 | 11/2010 | Danner et al. |
| 7,843,624 B2 | 11/2010 | Danner et al. |
| 7,843,626 B2 | 11/2010 | Amundson et al. |
| 7,859,637 B2 | 12/2010 | Amundson et al. |
| 7,893,435 B2 | 2/2011 | Kazlas et al. |
| 7,898,717 B2 | 3/2011 | Patry et al. |
| 7,955,532 B2 | 6/2011 | Liang et al. |
| 7,957,053 B2 | 6/2011 | Honeyman et al. |
| 7,986,450 B2 | 7/2011 | Cao et al. |
| 7,999,997 B2 | 8/2011 | Komatsu |
| 8,009,344 B2 | 8/2011 | Danner et al. |
| 8,009,348 B2 | 8/2011 | Zehner et al. |
| 8,027,081 B2 | 9/2011 | Danner et al. |
| 8,034,209 B2 | 10/2011 | Danner et al. |
| 8,049,947 B2 | 11/2011 | Danner et al. |
| 8,068,272 B2 | 11/2011 | LeCain et al. |
| 8,077,141 B2 | 12/2011 | Duthaler et al. |
| 8,077,381 B2 | 12/2011 | LeCain et al. |
| 8,089,453 B2 | 1/2012 | Comiskey et al. |
| 8,177,942 B2 | 5/2012 | Paolini, Jr. et al. |
| 8,208,193 B2 | 6/2012 | Patry et al. |
| 8,319,759 B2 | 11/2012 | Jacobson et al. |
| 8,373,211 B2 | 2/2013 | Amundson et al. |
| 8,389,381 B2 | 3/2013 | Amundson et al. |
| 8,390,301 B2 | 3/2013 | Danner et al. |

(56) References Cited

U.S. PATENT DOCUMENTS

| | | |
|---|---|---|
| 8,482,835 B2 | 7/2013 | LeCain |
| 8,498,042 B2 | 7/2013 | Danner et al. |
| 8,610,988 B2 | 12/2013 | Zehner et al. |
| 8,728,266 B2 | 5/2014 | Danner et al. |
| 8,754,859 B2 | 6/2014 | Gates et al. |
| 8,786,929 B2 | 7/2014 | LeCain et al. |
| 8,830,553 B2 | 9/2014 | Patry et al. |
| 8,830,560 B2 | 9/2014 | Danner et al. |
| 8,854,721 B2 | 10/2014 | Danner et al. |
| 8,891,155 B2 | 11/2014 | Danner et al. |
| 8,994,705 B2 | 3/2015 | Jacobson et al. |
| 9,075,280 B2 | 7/2015 | Whitesides |
| 9,152,003 B2 | 10/2015 | Danner et al. |
| 9,152,004 B2 | 10/2015 | Paolini, Jr. et al. |
| 9,238,340 B2 | 1/2016 | Kayal et al. |
| 9,310,661 B2 | 4/2016 | Wu et al. |
| 9,419,024 B2 | 8/2016 | Amundson et al. |
| 9,444,134 B2 | 9/2016 | Fontecchio et al. |
| 9,529,240 B2 | 12/2016 | Paolini, Jr. et al. |
| 9,554,495 B2 | 1/2017 | Danner et al. |
| 9,620,066 B2 | 4/2017 | Bishop |
| 9,671,635 B2 | 6/2017 | Paolini, Jr. |
| 9,697,778 B2 | 7/2017 | Telfer et al. |
| 9,726,957 B2 | 8/2017 | Telfer et al. |
| 9,733,540 B2 | 8/2017 | LeCain et al. |
| 9,778,500 B2 | 10/2017 | Gates et al. |
| 9,841,653 B2 | 12/2017 | Wu et al. |
| 10,037,735 B2 | 7/2018 | Amundson |
| 10,048,563 B2 | 8/2018 | Paolini, Jr. et al. |
| 10,048,564 B2 | 8/2018 | Paolini, Jr. et al. |
| 10,174,232 B2 | 1/2019 | Bzowej et al. |
| 10,190,743 B2 | 1/2019 | Hertel et al. |
| 10,372,008 B2 | 8/2019 | Telfer et al. |
| 10,446,585 B2 | 10/2019 | Harris et al. |
| 10,468,531 B2 | 11/2019 | Kimura et al. |
| 10,490,757 B2 | 11/2019 | Liu et al. |
| 2002/0060321 A1 | 5/2002 | Kazlas et al. |
| 2004/0105036 A1 | 6/2004 | Danner et al. |
| 2005/0012979 A1 | 1/2005 | Minami |
| 2005/0122306 A1 | 6/2005 | Wilcox et al. |
| 2005/0122563 A1 | 6/2005 | Honeyman et al. |
| 2005/0173701 A1* | 8/2005 | Kawase ............... H10K 10/481 257/40 |
| 2007/0052660 A1 | 3/2007 | Montbach et al. |
| 2007/0052757 A1 | 3/2007 | Jacobson |
| 2007/0126693 A1 | 6/2007 | Johnson et al. |
| 2009/0122389 A1 | 5/2009 | Whitesides et al. |
| 2009/0168067 A1 | 7/2009 | LeCain et al. |
| 2009/0315044 A1 | 12/2009 | Amundson et al. |
| 2011/0140744 A1 | 6/2011 | Kazlas et al. |
| 2011/0164301 A1 | 7/2011 | Paolini, Jr. et al. |
| 2011/0187683 A1 | 8/2011 | Wilcox et al. |
| 2011/0292319 A1 | 12/2011 | Cole |
| 2012/0128898 A1 | 5/2012 | Inoue et al. |
| 2014/0078024 A1 | 3/2014 | Paolini, Jr. et al. |
| 2017/0205649 A1 | 7/2017 | Wang et al. |
| 2017/0299938 A1* | 10/2017 | Telfer ..................... G02F 1/155 |

FOREIGN PATENT DOCUMENTS

| | | |
|---|---|---|
| WO | 1999067678 A2 | 12/1999 |
| WO | 2000005704 A1 | 2/2000 |
| WO | 2000038000 A1 | 6/2000 |

* cited by examiner

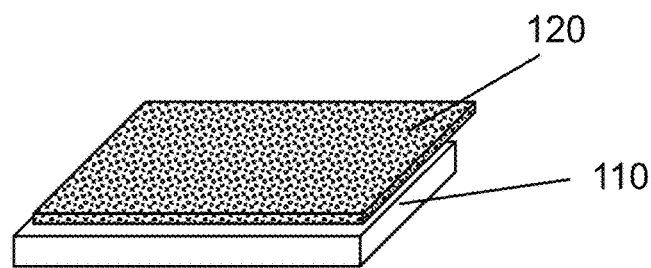
Fig. 1A
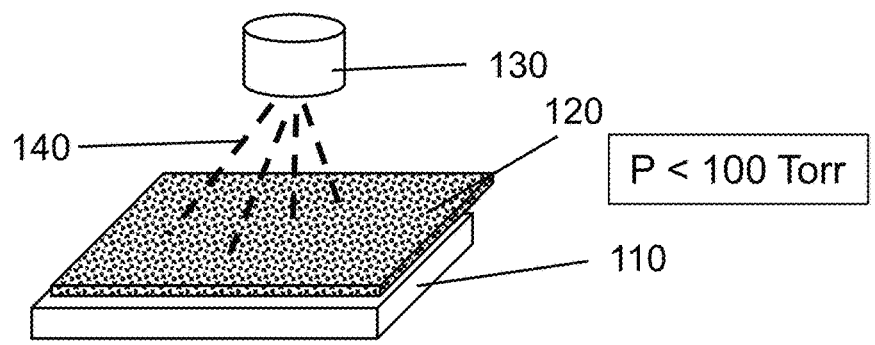
Fig. 1B
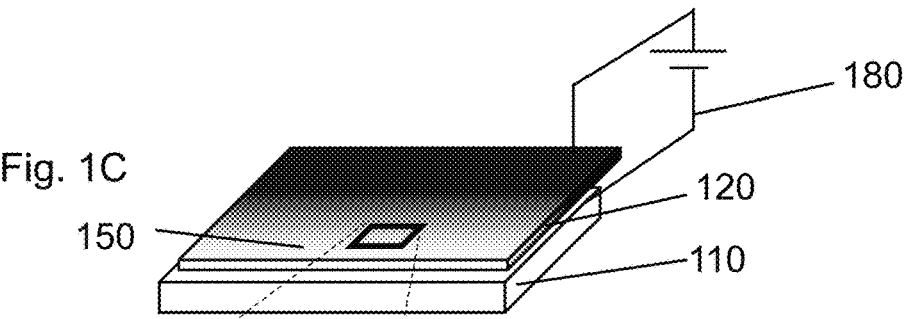
Fig. 1C
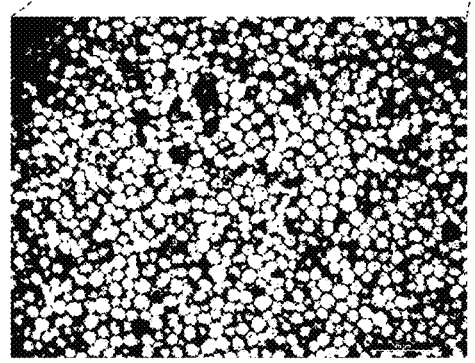  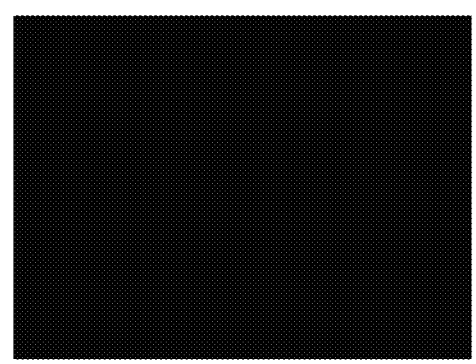
Fig. 1D                    Fig. 1E

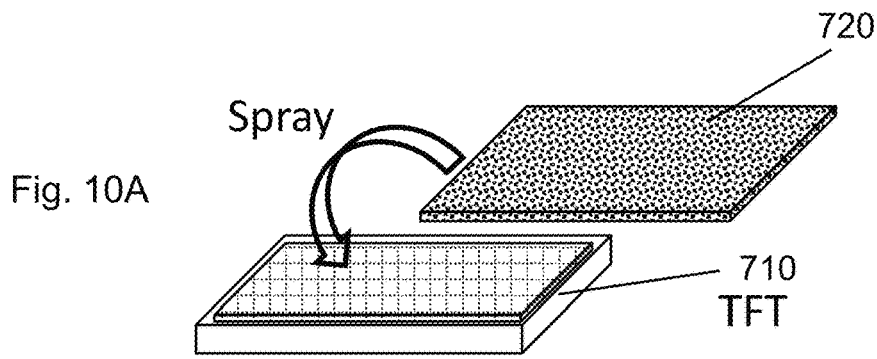
Fig. 10A
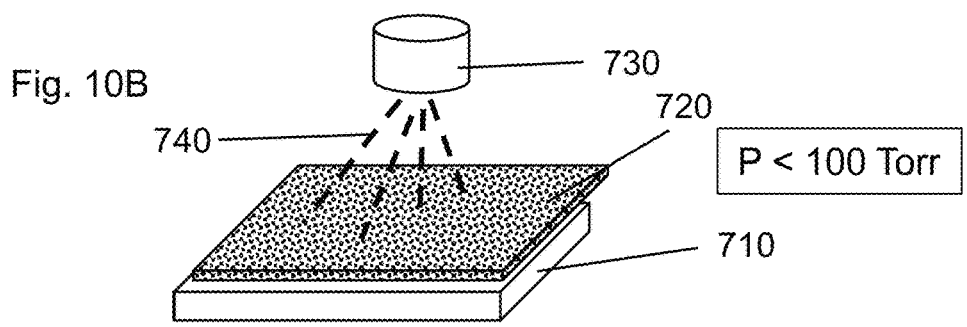
Fig. 10B
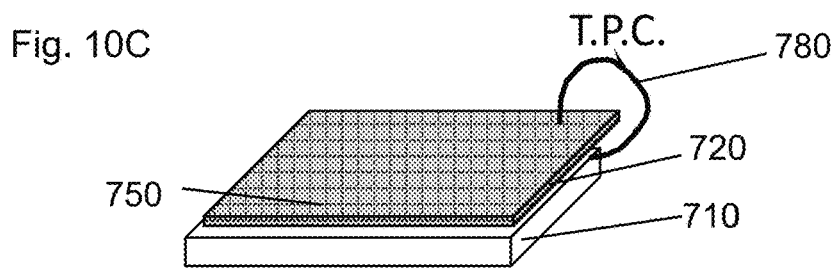
Fig. 10C
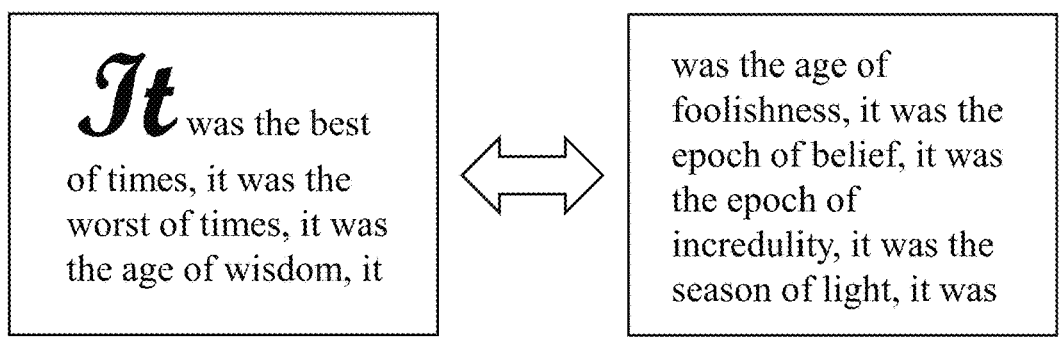
Fig. 10D
Fig. 10E

ELECTROPHORETIC DISPLAY LAYER WITH THIN FILM TOP ELECTRODE

RELATED APPLICATIONS

This application claims priority to U.S. Provisional Patent Application No. 62/971,285, filed Feb. 7, 2020. All patents and publications described herein are incorporated by reference in their entireties.

BACKGROUND OF INVENTION

In a typical encapsulated electrophoretic display, of the type found in most eReaders, a slurry of capsules is coated onto a prefabricated sheet of polyethylene terephthalate (PET) upon which indium tin oxide (ITO) has been deposited. The coated PET-ITO material is then incorporated into a stack including another electrode to make an electrophoretic display. The electrophoretic media typically comprise electrophoretic particles, charge control agents, image stability agents and flocculants in a non-polar liquid, typically encapsulated in a flexible organic matrix such as a gelatin/acacia coacervate. The PET-ITO material is electrically conductive, transparent, and has excellent barrier properties. In most commercial embodiments, the PET-ITO layer acts as the "top electrode" in that a user looks through this layer to see the patterns (e.g., text) displayed in the electrophoretic media. Additionally, an adhesive layer is typically coated onto the PET-ITO before the capsule slurry is coated to improve adhesion of the slurry, and to produce a more consistent capsule coating, preferably a monolayer of capsules on a substrate. This adhesive layer is typically at least 1 μm thick, more often approximately 5 μm thick. Often, the adhesive layer is doped to improve the conductivity as compared to typical adhesives, which are mostly dielectric. Typically, coating of encapsulated electrophoretic media on substrates is done with slot coating, in which a slurry of capsules in a carrier medium is forced through a slot on to a substrate that is moving relative to the slot. During commercial manufacturing, after the slurry is cured, a second adhesive is coated onto the opposing side of the layers of capsules and then a release sheet is applied to create a front plane laminate (FPL). At a later time, the release sheet is removed and the front-plane laminate is adhered to a backplane, for example an active matrix of thin film transistors (AM-TFT). This method is described in several patents issued by E Ink Corporation, including, for example U.S. Pat. No. 6,982,178, which is incorporated by reference in its entirety.

This standard method of producing a front plane laminate does have some limitations, however. Because at least one adhesive layer is used in the stack of encapsulated electrophoretic media, the electric fields across the capsules are not as strong as they would otherwise be if the capsules were, for example, directly between the two electrode layers. This condition increases the switching time for the display. Additionally, the adhesive layers can be the source of failures, for example delamination and discoloration. In some cases the dopants used in the adhesives can become mobile under high temperatures, which results in inconsistent switching of the electrophoretic media across the display, and may cause pixels of images to mix together, a condition known as "blooming."

SUMMARY OF INVENTION

As described herein, an alternative and improved method for producing a top plane electrode is provided. Because it is feasible to introduce encapsulated electrophoretic media into an evacuated chamber, it is possible to use thin layer deposition methods to coat an electrode layer directly atop the encapsulated electrophoretic media, thereby making the resulting stack of material thinner and achieving high local electric fields while providing the same voltages and using approximately the same amount of energy. Furthermore, these techniques of thin film deposition can be extended to coat the encapsulated materials with thin films of dielectric, which may be beneficial for preventing ingress of moisture, preventing short circuits due to, e.g., gaps between capsules and pinholes in the cured binder, and to improve the optical response of the electrophoretic medium.

Thus, in one aspect an electrophoretic display layer including a first substrate, a layer of capsules comprising electrophoretic media, the layer of capsules having a flat side and a contoured side, and a layer of light-transmissive conductive material in direct contact with the contoured side of the plurality of capsules, wherein the layer of capsules is disposed between the first substrate and the layer of light-transmissive conductive material. In some embodiments, the electrophoretic media comprises at least one type of charged particle that moves within the capsule in response to an applied electric field. In some embodiments, the layer of capsules additionally comprises a polyurethane binder between at least some of the capsules within the layer of capsules. In some embodiments, the first substrate is a release sheet. In some embodiments, there is an adhesive layer between the first substrate and the layer of capsules. In some embodiments, there is a planarizing layer disposed on the layer of light-transmissive conductive material. In some embodiments, there is a second substrate disposed on the planarizing layer such that the planarizing layer is disposed between the layer of light-transmissive conductive material and the second substrate. In some embodiments, there is a first layer of dielectric material disposed between the layer of capsules and the layer of light-transmissive conductive material. In some embodiments, the first layer of dielectric material comprises $Si_3N_4$, $SiO_2$, $Al_2O_3$, $HFO_2$, $ZrO_2$, or a polymer. In some embodiments, a second layer of conductive material is disposed between the first substrate and the layer of capsules comprising electrophoretic media. In some embodiments, a second layer of dielectric material is disposed between the second layer of conductive material and the layer of capsules. In some embodiments, the light-transmissive conductive material comprises indium tin oxide or zinc oxide. In some embodiments, the first substrate is substantially planar. In some embodiments, the first substrate is globally non-planar, but locally planar. In some embodiments, the second substrate is substantially planar.

In another aspect, a method of making an electrophoretic display layer including providing a first substrate, depositing a layer of capsules comprising electrophoretic media on the first substrate, thereby creating a contoured surface of the layer of capsules on the side of the layer of capsules opposite to the first substrate, and depositing a layer of light-transmissive conductive material on the contoured surface of the layer of capsules. In some embodiments, the step of depositing a layer of light-transmissive conductive material takes place at a vacuum pressure of less than 133 Pascal (1 Torr). In some embodiments, the step of depositing a layer of light-transmissive conductive material takes place at a vacuum pressure of less than 13 Pascal (100 mTorr). In some embodiments, the step of depositing is done with a chemical vapor deposition process. In some embodiments, indium tin oxide or zinc oxide is deposited as the light-transmissive conductive layer. In some embodiments, the method additionally includes depositing a first dielectric layer on the substrate prior to depositing the layer of capsules comprising electrophoretic media. In some embodiments, the dielectric layer comprises $Si_3N_4$, $SiO_2$, $Al_2O_3$, $HFO_2$, $ZrO_2$, or a polymer. In some embodiments, the method additionally includes depositing a second dielectric layer on the on the contoured surface of the layer of capsules comprising electrophoretic media prior to depositing the layer of light-transmissive conductive material over the second dielectric layer and on the contoured surface of the layer of capsules comprising electrophoretic media.

BRIEF DESCRIPTION OF DRAWINGS

FIGS. 1A-E illustrate a method of the invention to create an electrophoretic display layer using vapor deposition of indium tin oxide (ITO) at reduced ambient pressure. FIG. 1A shows coating a capsule slurry on a substrate including an electrode. FIG. 1B shows depositing ITO directly atop the coated capsules at a reduced ambient pressure to create a top transparent electrode. FIG. 1C shows providing a voltage source between the electrode and across the encapsulated electrophoretic medium. A close up view is shown in FIG. 1D whereby the capsules have been switched to the white state and the top transparent electrode is invisible. Upon switching the polarity, the close up view turns black as the oppositely-charged dark particles are driven to the viewing surface.

FIG. 2 additionally contemplates deposition of a dielectric layer on top of the coated capsules, as well as a moisture barrier atop the deposited clear conductor and a planarization layer atop the moisture barrier.

In FIGS. 4A-4E, a substrate including a second electrode has been coated with a dielectric to prevent shorting of the coated light-transmissive conductive material to the second electrode. See circled region 405.

FIGS. 10A-E illustrates a method for forming an active-matrix electrophoretic display suitable for use as an eReader by spray-coating capsules of electrophoretic material onto an active-matrix backplane and then sputtering a clear conductor directly onto the capsules. FIG. 10A shows spray coating capsules on a standard 6" thin-film-transistor (TFT) substrate including 1448×1072 electrodes and an image controller bonded to the substrate.

FIG. 10B shows depositing ITO directly atop the sprayed capsules at a reduced ambient pressure to create a top transparent electrode. FIG. 10C shows making a top plane connection (T.P.C.) between the T.P.C. drive electrode on the substrate and the deposited ITO layer. When the image controller is coupled to an external driver, it is trivial to produce very sharp text and move between pages, as depicted in FIGS. 10D and 10E.

DETAILED DESCRIPTION

Figure 2:
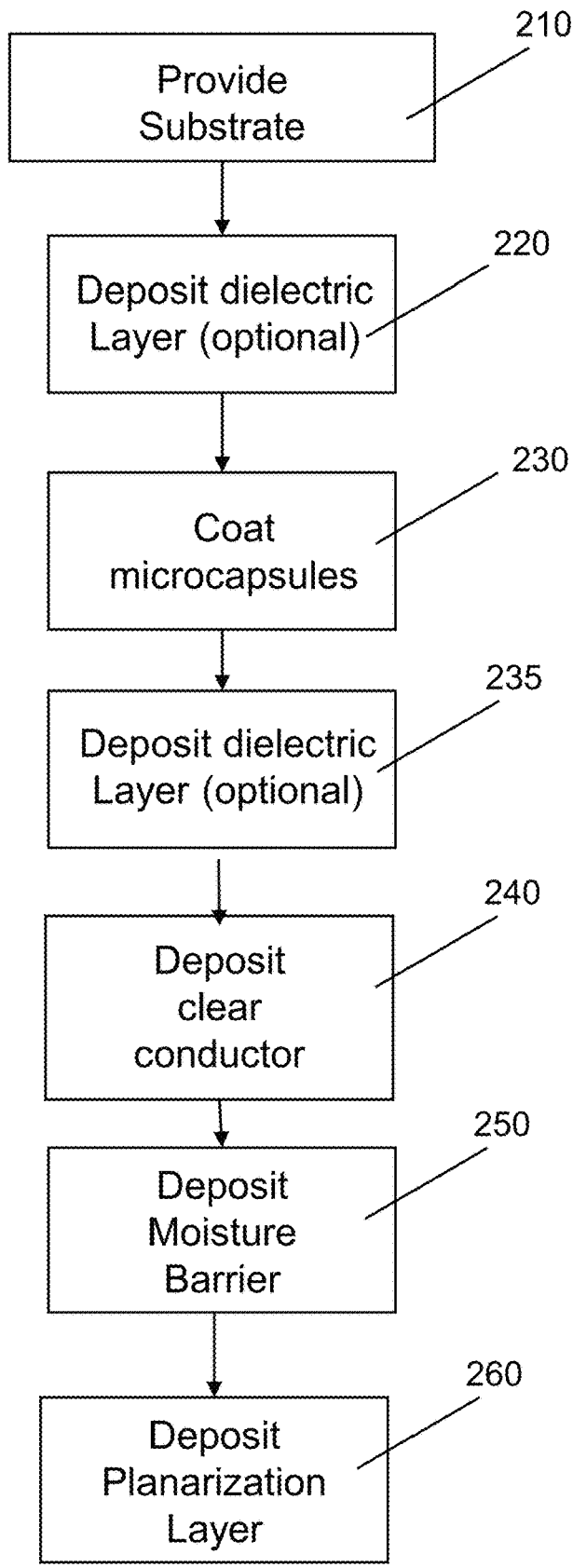
FIG. 2 illustrates a flowchart of a method described herein, whereby a substrate is optionally coated with a very thin layer of dielectric material to protect the device from shorting out in the event that some of the deposited ITO finds a passage through the capsule layer during deposition.

The invention includes, inter alia, electrophoretic displays layers including various thin films that are deposited directly onto a layer of capsules of electrophoretic media. For example, a thin film of a light-transmissive conductive material may be deposited to create a clear front electrode for an electrophoretic display. For example, a thin film of dielectric material can be deposited to create a barrier layer to prevent moisture ingress. Alternatively, both a dielectric layer and a thin film of a light-transmissive conductive material can be deposited over a layer of capsules of electrophoretic media. In some constructions, the dielectric layer is deposited on the capsules before the thin film of a light-transmissive conductive material is deposited. In other constructions, the thin film of a light-transmissive conductive material will be deposited before a dielectric layer is deposited. A variety of thin film deposition methods may be used to deposit these materials, such as such as sputtering, ablation, and vapor or solution deposition. In some embodiments, the deposition is done at less than atmospheric pressure, for example at 100 Torr or less.

An encapsulated electrophoretic display typically does not suffer from the clustering and settling failure mode of traditional electrophoretic devices and provides further advantages, such as the ability to print or coat the display onto wide format and flexible substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Accordingly, the resulting display can be large and flexible. Further, because the display medium can be printed (using a variety of methods); the display itself can be made inexpensively.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728; and 7,679,814;
(b) Capsules, binders and encapsulation processes; see for example U.S. Pat. Nos. 6,922,276; and 7,411,719;
(c) Films and sub-assemblies containing electro-optic materials; see for example U.S. Pat. Nos. 6,825,829; 6,982,178; 7,236,292; 7,443,571; 7,513,813; 7,561,324; 7,636,191; 7,649,666; 7,728,811; 7,729,039; 7,791,782; 7,839,564; 7,843,621; 7,843,624; 8,034,209; 8,068,272; 8,077,381; 8,177,942; 8,390,301; 8,482,835; 8,786,929; 8,830,553; 8,854,721; and 9,075,280; and U.S. Patent Applications Publication Nos. 2009/0109519; 2009/0168067; 2011/0164301; 2014/0027044; 2014/0115884; and 2014/0340738;
(d) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,327,511; 7,349,148; 7,352,353; 7,365,394; 7,365,733; 7,382,363; 7,388,572; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,843,626; 7,859,637; 7,893,435; 7,898,717; 7,957,053; 7,986,450; 8,009,344; 8,027,081; 8,049,947; 8,077,141; 8,089,453; 8,208,193; 8,373,211; 8,389,381; 8,498,042; 8,610,988; 8,728,266; 8,754,859; 8,830,560; 8,891,155; 8,989,886; 9,152,003; and 9,152,004; and U.S. Patent Applications Publication Nos. 2002/0060321; 2004/0105036; 2005/0122306; 2005/0122563; 2007/0052757; 2007/0097489; 2007/0109219; 2009/0122389; 2009/0315044; 2011/0026101; 2011/0140744; 2011/0187683; 2011/0187689; 2011/0292319; 2013/0278900; 2014/0078024; 2014/0139501; 2014/0300837; 2015/0171112; 2015/0205178; 2015/0226986; 2015/0227018; 2015/0228666; and 2015/0261057; and International Application Publication No. WO 00/38000; European Patents Nos. 1,099,207 B1 and 1,145,072 B1;
(e) Color formation and color adjustment; see for example U.S. Pat. Nos. 7,075,502; and 7,839,564;
(f) Methods for driving displays; see for example U.S. Pat. Nos. 7,012,600; and 7,453,445;
(g) Applications of displays; see for example U.S. Pat. Nos. 7,312,784; and 8,009,348; and
(h) Non-electrophoretic displays, as described in U.S. Pat. Nos. 6,241,921; 6,950,220; 7,420,549; 8,319,759; and 8,994,705; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths.

The methods described herein are generally applicable to coating a substrate with a layer of an encapsulated electrophoretic media and subsequently coating the layer of an encapsulated electrophoretic media with a thin layer of a light-transmissive conductive material. In many instances, the substrate will be substantially planar, for example a polymeric film having a thickness in the range of about 1 to about 25 mil (25 to 634 µm), preferably about 2 to about 10 mil (51 to 254 µm). A substrate may be, for example, a release sheet that is designed to be removed from a layer of electrophoretic display material prior to laminating the electrophoretic display material to, e.g., a backplane. In other embodiments, the substrate may be the backplane, itself, for example a thin-film-transistor (TFT) backplane including pixel electrodes. However, in other embodiments, the substrate may be flexible, for example a polymeric film coated with a clear conductor, such as indium tin oxide, which is able to be flexed to some extent before the clear conductor is damaged. In other embodiments, exotic flexible clear conductive materials, such as graphene or carbon nanotube impregnated polymers can be used as a substrate. In other embodiments, the substrate may be a simple conductive electrode, such as a metal film or a graphite layer. In other embodiments, the substrate may be substantially transparent, for example glass. The substrate need not be a film or a substantially planar material, for example, the substrate may be an object having an irregular surface such as a portion of the body of a vehicle. In such cases, the substrate will typically be locally planar, in that the microcapsule layer is deposited substantially flat against the substrate, thereby producing an opposed contoured surface upon which a thin film of light-transmissive clear conductor can be deposited. However, the substrate itself, is globally non-planar. Because of the very small scale of the microcapsules, a locally planar substrate may be substantially planar for only one centimeter, e.g, only five centimeters.

In an electrophoretic display, there are often one or more adhesive layers in the stack of layers. For example, there may be an adhesive layer between the electrophoretic layer and an electrode, and this layer of adhesive remains in the final display. Of course, this adhesive layer has significant effects on the electro-optic properties of the display. Inevitably, some of the voltage drop between the electrodes occurs within the adhesive layer, thus reducing the voltage available for driving the electrophoretic layer. The effect of the adhesive tends to become greater at lower temperatures, and this variation in the effect of adhesive with temperature complicates the driving of the display. The voltage drop within the adhesive can be reduced, and the low temperature operation of the display improved, by increasing the conductivity of the adhesive layer, for example by doping the layer with tetrabutylammonium hexafluorophosphate or other materials as described in U.S. Pat. Nos. 7,012,735 and 7,173,752.

A generalized method of preparing a thin film top electrode is illustrated in FIG. 1. A substrate 110 is provided, upon which a layer of encapsulated electrophoretic media 120 is deposited, e.g., with slot coating, dip coating, painting, spray coating, etc. The substrate 110 may be flexible or inflexible, and it may include an electrode layer, for example the substrate 110 may be a TFT array. Alternatively, the substrate may include a continuous or a segmented electrode layer that is transparent, translucent, or opaque. The layer of encapsulated electrophoretic medium 120 may comprise more than one type of charged pigment particles, e.g., as described in the patent above. Accordingly, the layer of encapsulated electrophoretic media 120 may alternate between, for example, white and black. Alternatively, the layer of encapsulated electrophoretic media 140 may comprise three particles wherein the first set of charged pigment particles is red, the second set of charged pigment particles is green, and the third set of charged pigment particles is blue. Alternatively, the layer of encapsulated electrophoretic media 120 may comprise three particles wherein the first set of charged pigment particles is red, the second set of charged pigment particles is black, and the third set of charged pigment particles is white. Alternatively, the layer of encapsulated electrophoretic media 120 may comprise four particles wherein the first set of charged pigment particles is white, the second set of charged pigment particles is cyan, the third set of charged pigment particles is yellow, and the fourth set of charged pigment particles is magenta. Alternatively, the layer of encapsulated electrophoretic media may comprise four particles wherein the first set of charged pigment particles is red, the second set of charged pigment particles is green, the third set of charged pigment particles is blue, and the fourth set of charged pigment particles is black. Alternatively, the layer of encapsulated electrophoretic media may comprise four particles wherein the first set of charged pigment particles is red, the second set of charged pigment particles is yellow, the third set of charged pigment particles is blue, and the fourth set of charged pigment particles is black.

After the layer of encapsulated electrophoretic material 120 is coated onto the substrate 110 and cured, the assembly is placed in an evacuated chamber suitable for thin film deposition. After the backing pressure has been reduced a deposition device 130 is used to deposit a thin film of a light-transmissive conductive material 140 directly on the layer of encapsulated electrophoretic material 120 to create a layer of light-transmissive conductive material 150, i.e., as shown in FIG. 1B and FIG. 1C. The deposition device 130 may be a sputtering device, an ablation device, a chemical vapor deposition device, or an atomic layer deposition device. For example, a variety of thin film deposition solutions are available from Veeco Corporation, Plainview, NY. The thin-film deposition process is typically done at less than atmospheric pressure, for example, less than 100 Torr, for example, less than 50 Torr, for example, less than 10 Torr, for example, less than 1 Torr, for example, less than 100 mTorr. In some instances, it may be necessary to slowly decrease the atmosphere on the layer of encapsulated electrophoretic material 120 to avoid burst capsules. In some instances, it may be necessary to intentionally dehydrate the layer of encapsulated electrophoretic material 120, e.g., by storing for a time under dry nitrogen.

Once the layer of light-transmissive conductive material 150 has been deposited, it is possible to connect the layer of light-transmissive conductive material 150 to a voltage source 180, thereby providing an electric field across the layer of encapsulated electrophoretic material 120, thereby creating an electrophoretic display as shown in FIG. 1C. A viewer will look through the layer of light-transmissive conductive material 150 to see the state of the layer of encapsulated electrophoretic material 120. For example when the substrate 110 is a glass slide coated with graphite, the white state appears as a plurality of circles under an optical microscope, as shown in FIG. 1D. When the polarity of the voltage source 180 is reversed, the field appears completely black as shown in FIG. 1E.

It is to be understood that the substrate 110 need not be rigid, and can be flexible to the degree that bending does not cause rupture of the capsules within the layer of encapsulate electrophoretic media or cause the layer of light-transmissive conductive material 150 or the back electrode material to fail. For example, the substrate 110 may comprise a clear polymer, such as polyethylene terephthalate (PET), polycarbonate, polypropylene, acrylic, or cyclic olefin copolymer (COC). The integrity of the layer of light-transmissive conductive material 150 can be reinforced by over-coating the layer of light-transmissive conductive material 150 with a barrier layer, such as a layer of polyurethane.

A method of making an electrophoretic display layer including a layer of light-transmissive conductive material in represented by the flowchart in FIG. 2. As will be clear with respect to FIGS. 3-5, the flow chart in FIG. 2 is exemplary and other variations can be used to create an electrophoretic display layer with fewer or more layers. Beginning with step 210 a substrate is provided. As discussed above, the substrate may comprise a polymer; however, other materials, such as metal or glass, are also suitable. The substrate may be shaped before the process begins with a process such as thermoforming, casting, injection molding, blow-molding, grinding, etching, or cutting. The substrate may be a part to a larger component, e.g., a portion of a vehicle or a building material, such as a window. The substrate may include a conductive material. After the substrate is provided in step 210, an optional dielectric layer is applied in step 220. The dielectric layer may include any suitable material. In some instances, thin films of high dielectric materials, such as $Si_3N_4$, $SiO_2$, $Al_2O_3$, $HFO_2$, $ZrO_2$, or polymers are preferred. Films of such material may be less than 1 μm in thickness, e.g., less than 500 nm in thickness, e.g., less than 200 nm in thickness, e.g., less than 100 nm in thickness, e.g., less than 50 nm in thickness, e.g., less than 20 nm in thickness, e.g., less than 10 nm in thickness. For example, the thin film dielectric layers may be between 1 nm and 500 nm in thickness, e.g., between 10 nm and 100 nm in thickness. Other dielectric materials may be, e.g., thin polymer coatings, which can be achieved with vapor deposition.

Suitable polymer for thin films include polyurethanes, polyimides, and polyacrylates. Dielectric polymer layers between the capsule layer and the viewing side electrode must be light-transmissive, and have an index of refraction that does not distort the optical condition of the capsule layer, below. In particular, polymer layers with low conductivity (<5000 pS/cm at 25° C.) and moderate relative permittivity (preferably, in the range of 1.8-10) provide the desired combination of dielectric separation between an electrophoretic medium and a light-transmissive electrode. Typically, such layers have a thickness of less than 0.5 μm, preferably less than 300 nm, preferably less than 200 nm, preferably less than 100 nm. The polymer layers may be formed from polyimides, polycarbonates, polyethers, polyesters, polyquinolines, polyquinoxalines, polyoxadiazole, polynorbornenes, cyclo-olefins and cyclo-olefin copolymers, polytetrafluoroethylene, polyperfluorocyclobutene, polybenzocyclobutene, polybenzoxazoles, and fluorocarbons, such as polytetrafluoroethylenes, e.g., Teflon AF (poly [4,5-difluoro-2,2-bis(trifluoromethyl)-1,3-dioxole-co-tetrafluoroethylene]). In some embodiments, the dielectric may also act as an adhesive, such as polyurethane adhesives, vinyl acetate adhesives, epoxies, and acrylic adhesive, such as those described in U.S. Pat. No. 7,012,735, which is incorporated herein by reference.

In step 230, the resulting structure (substrate and optional dielectric layer) is coated with a layer of an encapsulated electrophoretic media. This step may be accomplished using a process such as slot coating, spray coating, dip coating, electrodeposition, powder coating, silk screening, or brush-painting. The encapsulated electrophoretic medium may be delivered as a slurry of capsules and a polyurethane binder, or the encapsulated electrophoretic medium may be delivered "freeze dried", i.e., after lyophilization. Typically, the coated material will be cured to set the binder, e.g., with heat and/or pressure, or radiation-cured with ultraviolet radiation. The solid electro-optic layer is typically an encapsulated electrophoretic layer but may also be a polymer-dispersed electrophoretic layer or a rotating bichromal member or electrochromic layer.

After the layer of encapsulated electrophoretic media has been coated, the coated substrate may need to be conditioned prior to executing the next steps. In some instances, an intervening dielectric layer will be deposited onto the capsule layer, as shown in step 235. Any of the dielectric materials discussed previously with respect to step 220 can be used in step 235. After deposition of a dielectric layer, or if a dielectric layer is not used, a thin-film conductor is deposited in step 240. In some instances, it may be useful to mask off a portion of the substrate and/or the layer of encapsulated electrophoretic media with, e.g., masking tape, prior to coating the assembly with a thin-film conductor. Accordingly, once the mask is removed, clear access to the back conductor is provided to allow easy coupling of the front and back conductors to the voltage source. Polymeric films that have been found useful as masking layers include Kapton® tape (a polyimide tape available from du Pont de Nemours & Company, Wilmington, DE) and RP301 film (an acrylic film available form Nitto America, Inc., Fremont CA).

As described with respect to FIG. 1, a thin film of a light-transmissive conductive material is applied to the layer of encapsulated electrophoretic material in step 240. The method may include sputtering, ablation, or chemical vapor deposition or solution deposition. The material may be any suitable light-transmissive conductive material that can form a thin film, such as indium tin oxide, zinc oxide, cadmium oxide, doped indium tin oxide, doped zinc oxide, or doped cadmium oxide. After a layer of light-transmissive conductive material is deposited, an optional moisture barrier may be deposited atop the layer of light-transmissive conductive material in step 250. The moisture barrier will prevent water from getting into the capsule layer where it will diminish the performance of the encapsulated electrophoretic medium. The moisture barrier may be a thin film dielectric as described above with respect to step 220. The moisture barrier may also be a low water vapor transmission rate (WVTR) polymer, such as a polyurethanes, polypropylene, polyethylenes, e.g., HDPE or PET, or ethylene vinyl alcohol.

Figure 5A:
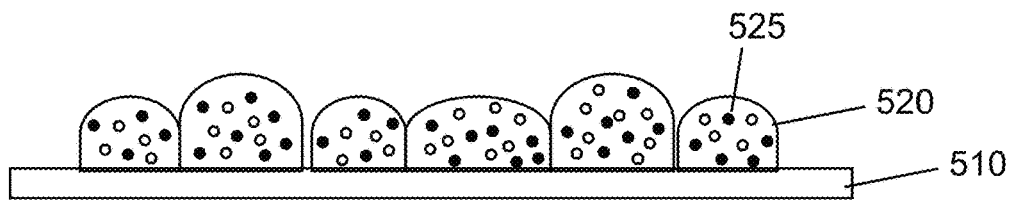
FIGS. 5A-5F depict the various steps in the creation of an electrophoretic display layer, including the deposition of a light-transmissive conductive material over a dielectric layer deposited directly on a layer of capsules comprising electrophoretic media. The dielectric layer may be very thin (e.g., 100 nm, e.g., 50 nm, e.g., 20 nm or less) but act as a moisture barrier and also prevent shorts between electrodes in the resulting electrophoretic display.
Figure 5B:
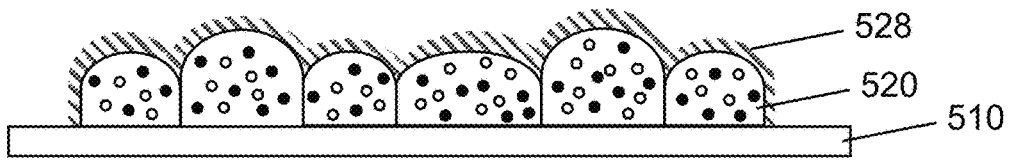
Figure 5C:
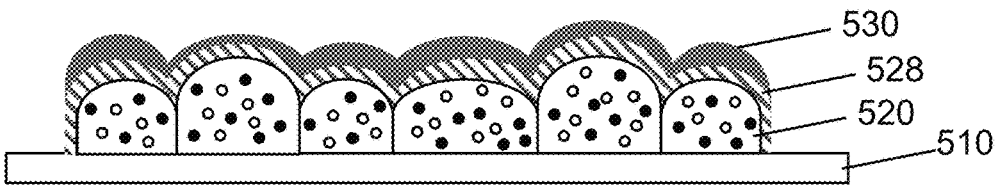
Figure 5D:
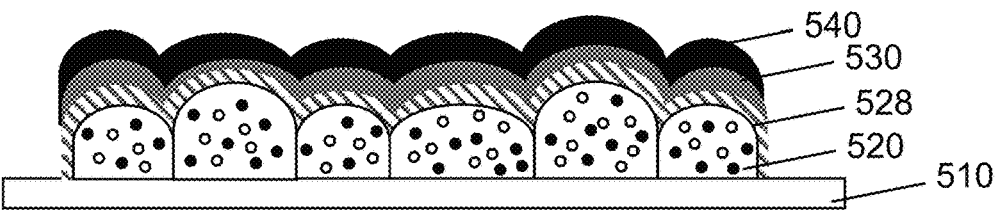
Figure 5E:
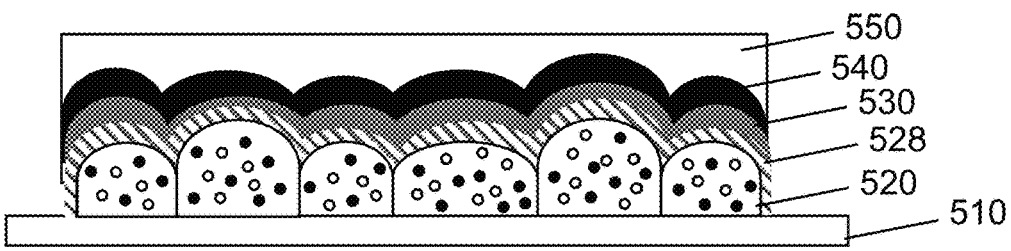
Figure 5F:
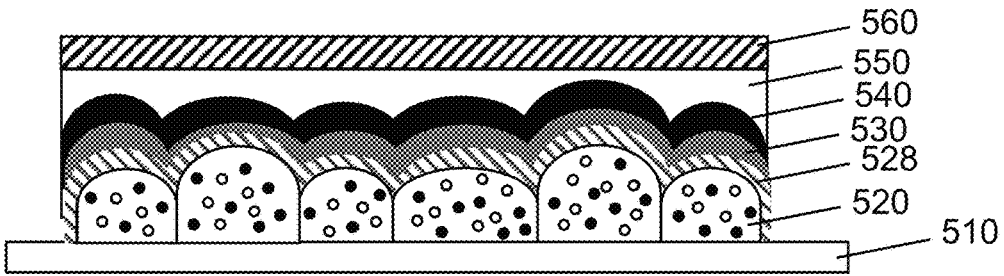

The moisture barrier should be substantially light-transmissive. The moisture barrier may range in thickness between 1 nm (thin film) to 20 µm (coated polymer film). For example, a thin moisture barrier material may be less than 1 µm in thickness, e.g., less than 500 nm in thickness, e.g., less than 200 nm in thickness, e.g., less than 100 nm in thickness, e.g., less than 50 nm in thickness. For example, the thin film dielectric layers may be between 1 nm and 500 nm in thickness, e.g., between 10 nm and 100 nm in thickness. While not described in the flow chart in FIG. 2, it is also contemplated that a thin-film moisture barrier may be deposited directly on the layer of encapsulated electrophoretic media as shown in FIG. 5B before deposition of a thin film of light-transmissive conductive material as shown in FIG. 5C.

Finally, after the optional moisture barrier has been applied, an optional planarization layer may be deposited in step 260. The planarization layer is best viewed in FIGS. 3D, 4D, and 5E. The planarization layer "levels out" the surface morphology that results from the coating step, and assures a more uniform bond with the top substrate, e.g. a protective sheet, e.g., a UV filter layer, or some other sealing layer. That is, the compositions can be spread over an irregular surface and cured to create an adhesive layer that is thin, smooth, and with substantially no voids left between the irregular surface and the composition. The planarization layer may comprise polyesters, urethanes, or acrylics, and may comprise dopants, cross-linkers, and/or adhesion promoters. In some embodiments, the planarization layer may be less than 25 µm thick, i.e., less than 10 µm thick, i.e., less than 5 µm thick, i.e., less than 3 µm thick. The planarization layer may have an overall volume resistivity of less than $10^{10}$ Ohm·cm, i.e., about $10^9$ Ohm·cm.

Figure 3A:
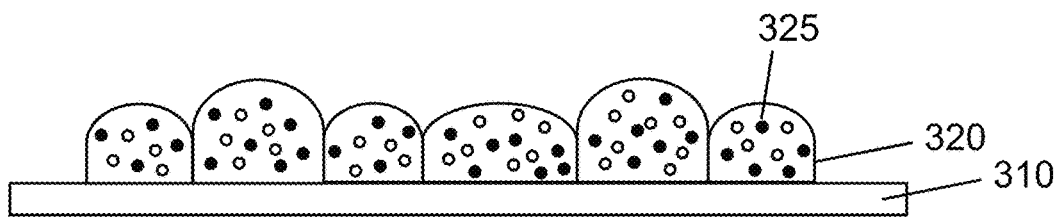
FIGS. 3A-3E depict the various steps in the creation of an electrophoretic display layer, including the deposition of a light-transmissive conductive material directly on a layer of capsules comprising electrophoretic media.
Figure 3B:
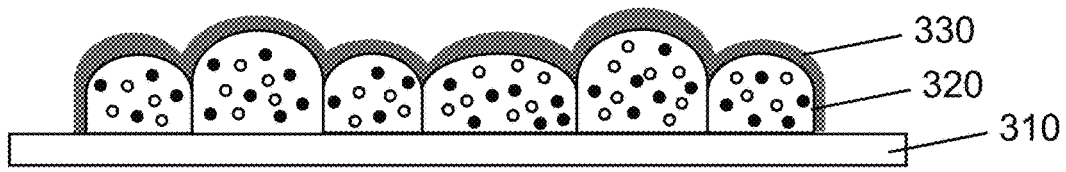
Figure 3C:
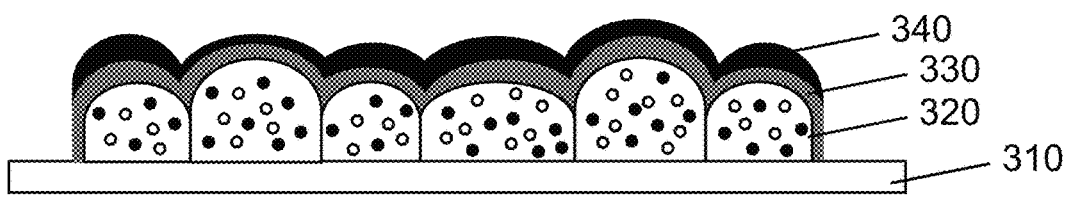
Figure 3D:
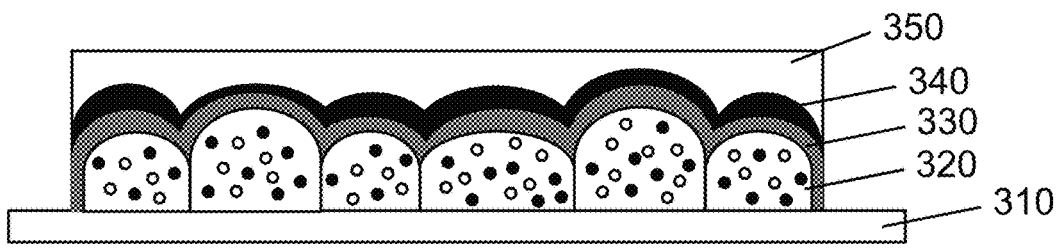
Figure 3E:
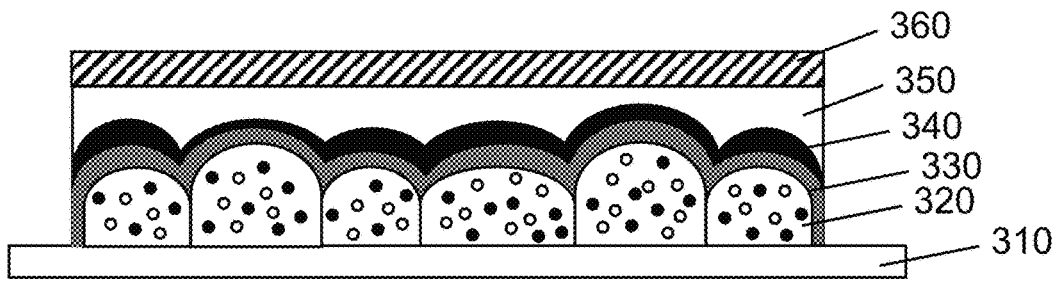

A variety of embodiments, and the layer-by-layer construction of these embodiments can be seen in FIGS. 3A-5F. Notably, the layers and the features are not to scale. For example, the microcapsules 320 are typically on the order of 30-50 µm, while the light-transmissive conductive material 330 is on the order of 50-200 nm. Construction of a simple electrophoretic layer is shown in FIG. 3A-3E. In FIG. 3A, a simple substrate 310, which could be a sheet of metalized release with adhesive, is coated with a slurry including microcapsules 320 with electrophoretic particles 325 in a hydrocarbon solvent. In FIG. 3B, the layer of microcapsules 320 is coated with a light-transmissive conductive material 330, such as indium-tin oxide (ITO). Subsequently, a barrier layer 340 is applied to the light-transmissive conductive material 330 to manage moisture ingress in FIG. 3C. The barrier layer 340 may be, for example, polyethylene, or some other dielectric. Next, in FIG. 3D a polyurethane planarization layer 350 is applied to the barrier layer 340. A protective sheet 360 is finally applied to the stack to complete the electrophoretic display layer. After completion, the substrate 310 may be removed and the remainder of the stack laminated to an electrode structure, for example an active matrix of pixel electrodes.

Figure 4A:
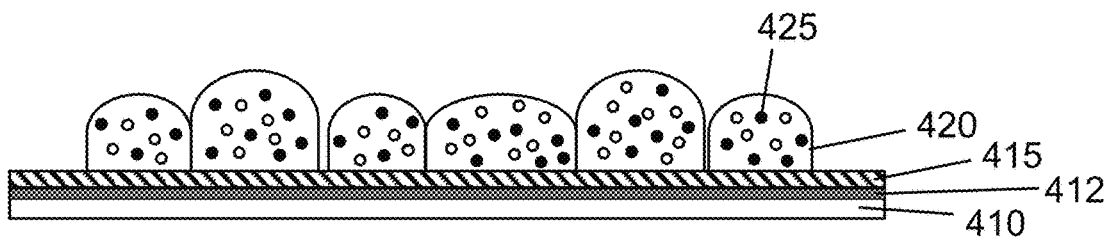
FIGS. 4A-4E depict the various steps in the creation of an electrophoretic display layer, including the deposition of a light-transmissive conductive material directly on a layer of capsules comprising electrophoretic media.
Figure 4B:
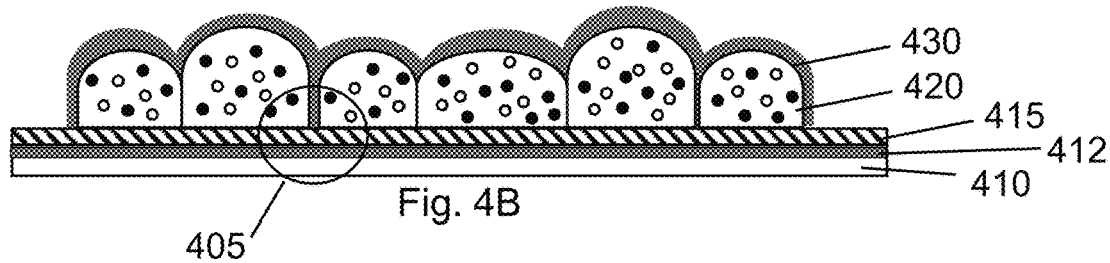
Figure 4C:
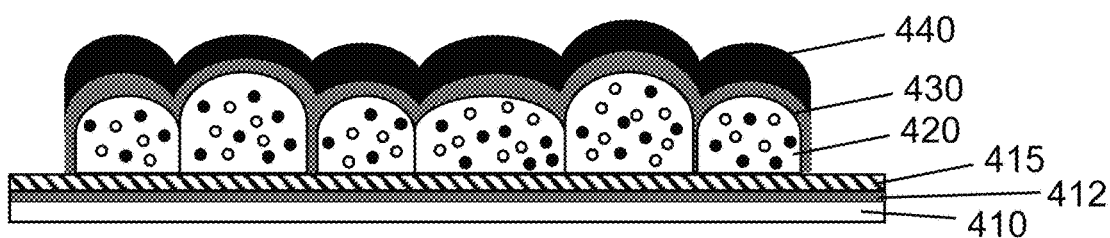
Figure 4D:
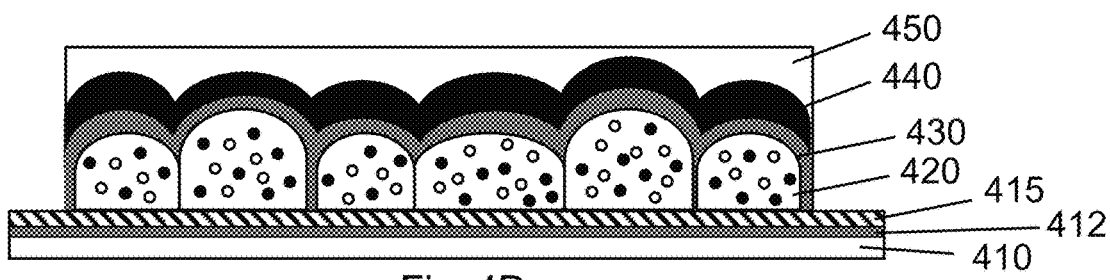
Figure 4E:
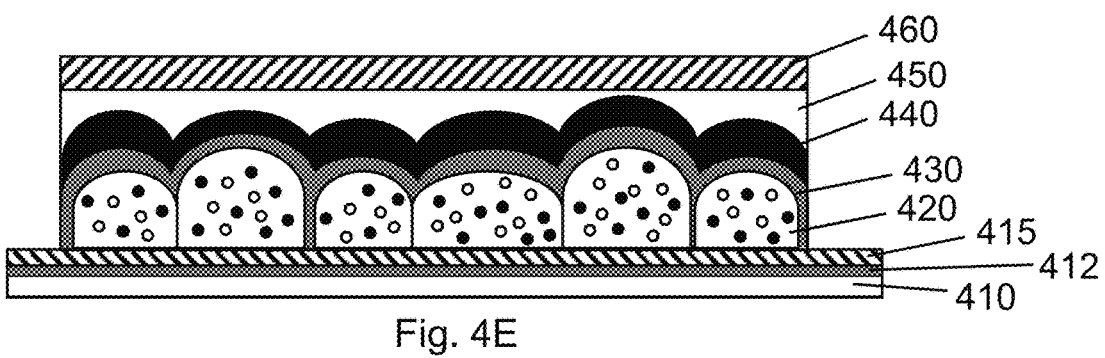

Alternatively, a simple electrophoretic display can be created as shown in FIG. 4A-FIG. 4E. In FIG. 4A, the substrate 410 has been coated with a bottom electrode layer 412 as well as a dielectric layer 415. The completed substrate/electrode/dielectric may be a part of a larger object or it may be an active matrix backplane or a segmented backplane. As before, the substrate 410 is coated with a slurry including microcapsules 420 with electrophoretic particles 425 in a hydrocarbon solvent. It is notable that in FIG. 4A, there are gaps between some of the microcapsules 420 in the layer. As a result of these gaps, when the microcapsules 420 are coated with a light-transmissive conductive material 430, such as ITO, some of the ITO could create an electrical short to the bottom electrode 412, but such shorts are prevented by the dielectric layer 415. For example, see the circled area 405 in FIG. 4B. Subsequently to application of the light-transmissive conductive material 430, a barrier layer 440 is applied to the light-transmissive conductive material 430 in FIG. 3C. Next, in FIG. 4D a polyurethane planarization layer 450 is applied to the barrier layer 440. A protective sheet 460 is finally applied to the stack to complete the electrophoretic display. Such a display presents improved contrast ratios for a given drive voltage because the local electric fields are actually quite a bit stronger due to the lack of adhesive layers between the electrodes.

In yet another embodiment, as shown in FIG. 5B, a dielectric layer 528 can be formed atop the microcapsules 520 to provide a moisture barrier, and to prevent shorting when the light-transmissive conductive material 530 is deposited overtop of the moisture barrier as shown in FIG. 5C. Additionally, as discussed in the Examples, an intervening dielectric layer improves the overall optical performance of the display by reducing kickback. Similar to FIG. 3A-3E and FIG. 4A-4E, in FIG. 5A-5F, the stack-up may also include a substrate 510, microcapsules 520, electrophoretic pigments, 525, light-transmissive conductive material 530, barrier layer 540, planarization layer 550, and a protective sheet 560.

Spray Coating Process

As already mentioned, this invention may be constructed by spraying capsules of an electrophoretic medium on to a substrate. This process comprises forming a dispersion of the capsules in a liquid; feeding the dispersion through a first orifice; and feeding a continuous stream of gas through a second, annular orifice surrounding the first orifice, thereby forming a spray of the capsules. This spray coating process has the advantage over slot coating that spray coating normally does not require the use of rheology modifiers in the liquid being sprayed, so that the final coating is free from such rheology modifiers and hence free from the effects such rheology modifiers may have upon the properties of slot coated electrophoretic media. Typically, in spray coating, only the additives actually needed in the final product need be added to the liquid being sprayed.

Figure 6:
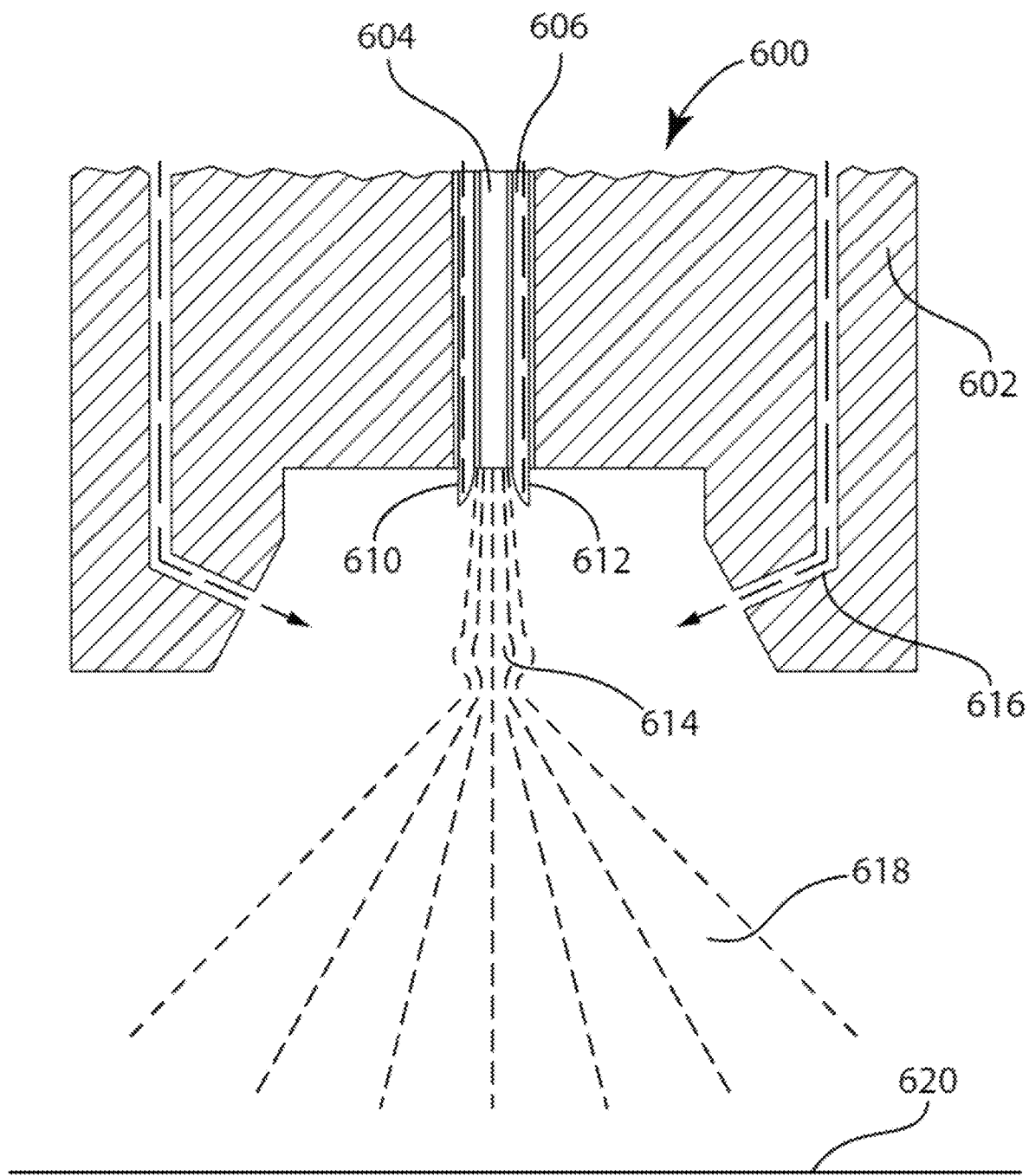
FIG. 6 illustrates a spray head that may be used to deposit capsules of electrophoretic media on a substrate.

FIG. 6 is a schematic cross-section through a simple spray coating nozzle (generally designated 600) that may be used in the spray coating process of the present invention. The nozzle 600 comprises a substantially cylindrical body 602 having a central, axial bore 604 through which is pumped electrophoretic capsules (not shown) dispersed in a liquid (also not shown). The central bore 604 is surrounded by an annular bore 606, through which is forced a continuous stream of air. The lower end of the central bore 604 terminates in an orifice 608, which the lower end of the annular bore 606 terminates in an annular orifice 610, which surrounds orifice 608. A cylindrical baffle 612 surrounds the annular orifice 610. The air flow through the annular orifice 610 constrained by the baffle 612 causes the dispersion of capsules passing through orifice 608 to form a spray or jet 614.

The nozzle 600 is also provided with shaping air bores 616, which may be six or eight in number. As shown in FIG. 6, the peripheral portions of the nozzle 600, through which the bores 616 pass, extend downwardly below the orifices 608 and 610 and the baffle 612, and the lower portions of the bores 616 are directly downwardly and inwardly. Shaping air is forced continuously through the bores 616 so that it impinges on the jet 614, thereby causing the jet to open out into a wide spray 618, which impinges on a substrate 620 disposed below the nozzle 600.

The quality of capsules coatings is assessed in terms of their reproducibility granularity, mean coating weight, uniformity and defect density; defect density is quantified by the number of non-switching capsules per unit display area in a standard display structure, which for present purposes is defined as a backplane bearing, in order, a 25 µm layer of lamination adhesive, a 20 µm capsule layer and a front substrate comprising an ITO layer on 25 µm polyethylene terephthalate film. Preferably, the ratio of atomization air outlet cross-section to capsule dispersion outlet cross section is not greater than about 8.5, and preferably between about 5.0 and about 7.0. The capsule dispersion orifice diameter is preferably in the range of about 1.0-1.40 mm. The capsule dispersion may contain capsules in a weight fraction preferably between about 38.0 and about 40.5 weight percent; this dispersion may optionally contain 1-butanol at a concentration of up to about 4.0 weight percent and a surfactant, such as Triton X-100 at a concentration of up to about 0.04 weight percent.

A wide range of capsule dispersion feed rates and atomization air feed rates can be used in the spray coating process of the present invention. Typically, the capsule dispersion feed rate, $M_F$, is not less than about 30 g/min and not greater than about 70 g/min, the optimum being determined mainly on the basis of an appropriate residence time in the atomization zone, that is to say the region in which the capsule dispersion column emerging from the first orifice breaks into sheets of fluid, which subsequently break into ligaments and finally droplets. Desirably, the droplet size distribution is such that the mean capsule count per droplet is less than about 5.0, and the standard deviation is less than about 3.0, capsules per droplet. The atomization air feed rate is set on the basis of a critical air velocity, $v^*$, measured at the second orifice, and is typically of the order of about 100 m/sec. In the preferred process, a total air feed rate, $M_A$, (including atomization air and shaping air) of approximately 150 to 200 g/min is employed in the absence of shaping air, and up to 300 g/min with shaping air.

It has also been found that the quality and uniformity of the sprayed capsule coating can be strongly influenced by pretreatment of the substrate and by additives added to the capsule dispersion. Useful pretreatments and additives include but are not limited to:

1) Capsule dispersions that incorporate surfactants such as Triton X-100, butanol etc. to improve wetting of the substrate surface;
2) Pre-coating of the substrate surface with sub-layers incorporating surfactants such as Triton X-100, 1-butanol, and others possessing a detergent structure, and optionally a polyurethane latex;
3) Pre-treating the substrate with an atmospheric plasma or corona discharge treatment; and
4) The capsule dispersion may contain polymeric binders, for example a polyurethane latex.

As already mentioned, the spray coating process of the invention may include the use of a masking material covering part of the substrate so that, after removal of the masking material, capsules remain only on those portions of the substrate where the masking material was not present. The masking material used to cover part of the substrate should not be porous, or at least should have low enough porosity to ensure that capsule deposition on to the masked areas of the substrate does not occur. The masking material should not significantly absorb the liquid (usually aqueous) in which the capsules are dispersed, and should be placed close enough to the surface of the substrate that lateral draft of capsules beneath the masking material from the unmasked regions of the substrate into the masked areas does not occur. After the capsules have been deposited on the substrate, the capsules may be dried (or otherwise treated to form a coherent layer, for example by exposure to radiation) with the masking material still in position, or the masking material may first be removed and then the capsules dried or otherwise treated. In either case, the physical properties of the masking material and the capsule dispersion should be chosen so that, during the removal of the masking material, capsules are not dragged into previously masked areas of the substrate, nor are capsules removed from unmasked areas (for example, by irregular tearing of a coherent dried layer of capsules).

The masking film may comprise an adhesive pre-laminated on to the surface on to which the capsules are to be deposited, and a release film exposed to the spray. After capsule deposition, the release film is removed, followed by additional processing. The resultant spray-printed film may then be laminated to a backplane, which may be either transparent or opaque.

EXAMPLES

Example 1

A layer of encapsulated electrophoretic media was produced by slot die coating a polyurethane slurry of collagen/acacia capsules of black and white charged electrophoretic media onto a PET-ITO substrate, as illustrated in FIG. 4A. More details of the encapsulation process, the slurry formation, and the slot coating process can be found in U.S. Pat. No. 6,982,178. Prior to coating, Kapton® tape was used to mask the edges of the substrate, thereby allowing for an easy electrical connection at the completion of the process. After curing the binder with heat, a conformal coating of 100 nm of Indium Tin Oxide (ITO) was deposited onto a monolayer of capsules using radio-frequency sputtering (Semicore Equipment, Livermore, CA). During the sputtering process, the layer of encapsulated electrophoretic media was exposed to 8 mTorr of vacuum for 1500 seconds.

An electrophoretic display was created by proving an electrical potential between the sputtered ITO electrode and the ITO on the substrate, similar to FIG. 1C. When viewed from the sputtered ITO side, the white state measured 81±1L* and the dark state measured 45±1L* when driven with ±30V. The dark state, as well as white state, showed a glossy finish, which was likely due to the scattering of light from the facets formed by depositing ITO onto the microcapsule surfaces.

Figure 7:
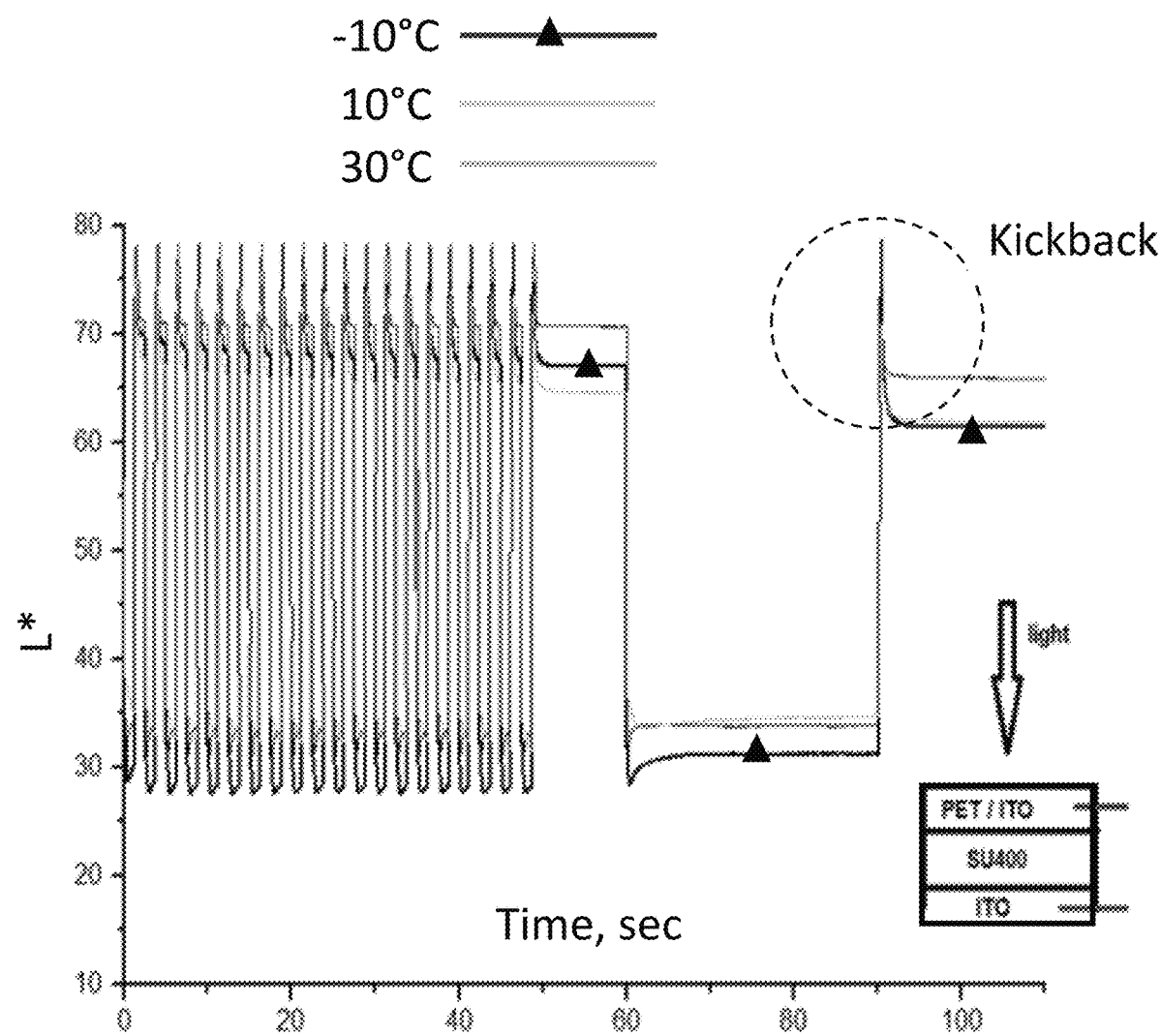
FIG. 7 shows measured optical kickback at three operating temperatures for a display stack that only includes a layer of PET/ITO, a layer of microcapsules sprayed onto the PET/ITO, and thin layer of ITO deposited on the capsules.

While the white and dark states of the simple PET-ITO—capsule—ITO stack were quite good, it was found that the amount of self-erasing (a.k.a. kickback) was substantial, as shown in FIG. 7. Especially after sustained driving to the white state, the kickback upon reversing to the black state was on the order of 15L*, which is very noticeable to a viewer, and typically unacceptable for commercial applications. (See dashed circle in FIG. 7). While it was observed that the kickback was smaller at higher temperatures, the overall amount of kickback still quite high.

Example 2

A second sample was prepared as in EXAMPLE 1, but additionally included a polyurethane planarization layer atop the sputtered 100 nm ITO, and a film of matte PET was laminated on top of the planarization layer for additional protection. The white state of the second sample remained almost the same while the dark state was reduced by 36% to 29L*.

TABLE 1

Reflective electro-optic measurements for samples driven at ±30 V.

| | White State (L*) | Dark State (L*) | Contrast Ratio |
|---|---|---|---|
| Sample 1: Viewed from PET ITO side | 75.70 | 19.0 | 3.98 |
| Sample 1: Viewed from sputtered ITO side | 80.2 | 45.4 | 1.76 |
| Sample 2: Viewed from sputter ITO side (with planarization layer and protective sheet) | 79.97 | 29.3 | 2.73 |

It is likely that the improved dark state with the planarization layer and matte PET film was an artifact of the measurement technique. Because the sputtered ITO is very smooth, it reflects a good amount of the incident light, even when the electrophoretic medium has been driven to a dark state. Once the matte PET top protective sheet was added, as is typically for most electrophoretic displays, there was less back-reflection, and the measured dark state decreased in L*.

Example 3

Another variation on Example 1 was created, which included a thin (10 nm thick) layer of $SiO_2$ deposited via RF sputtering directly atop the slot-coated microcapsules, which was in turn followed with 100 nm of Indium Tin Oxide (ITO), also deposited using radio-frequency sputtering. The resulting assembly is similar to FIG. 5C, described above.

Figure 8:
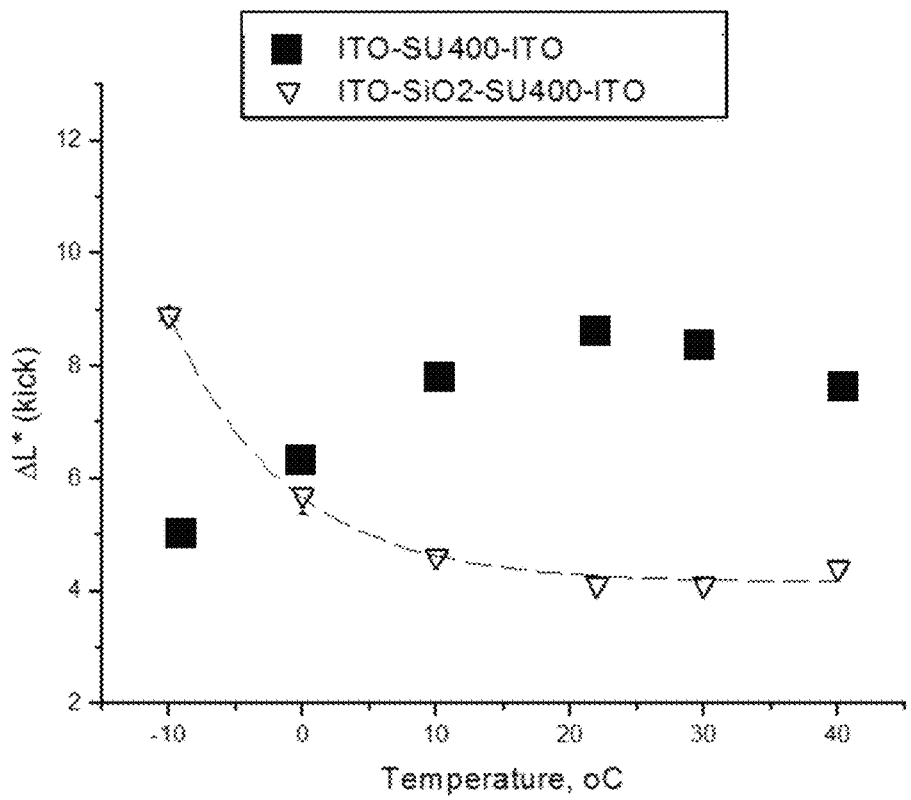
FIG. 8 shows kickback as a function of temperature for two simple microcapsule displays. By including an intervening dielectric layer, the kickback is reduced over a wide temperature range.

Adding an intervening dielectric layer greatly improved the measured kickback, especially at higher temperatures, as shown in FIG. 8. The kickback manifests itself as optical self-erasing; when an electro-optic display is driven from one extreme optical state to the opposed extreme optical state by application of a drive pulse and then allowed to stand with no electric field applied to the electro-optic medium, for a short time, the electro-optic medium relaxes back towards the one extreme optical state from which it was driven. See, e.g., FIG. 7. Notably, as shown in FIG. 8, the kickback was approximately half as large in the presence of a rather thin dielectric layer between the microcapsules and the conductive ITO layer.

Figure 9:
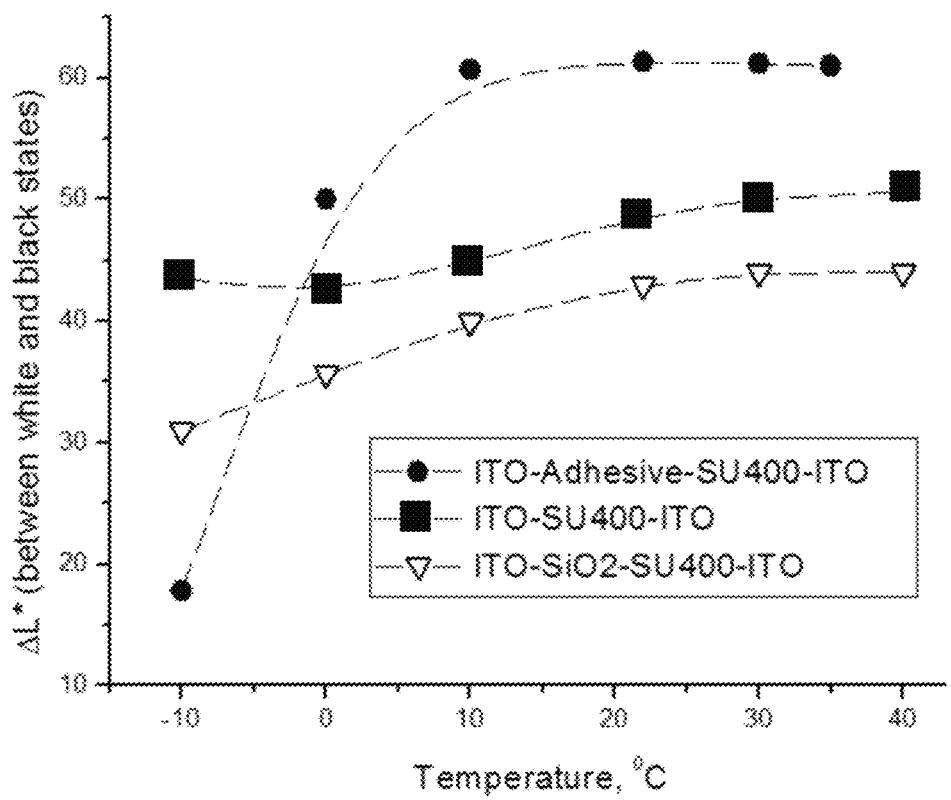
FIG. 9 shows total contrast between white and black states for the two simple microcapsule displays of FIG. 8 and a comparison to a "conventional" microcapsule electrophoretic display, including a doped adhesive layer between the microcapsules and at least one layer of PET/ITO.

In addition to diminishing the kickback observed, versus when ITO is sputtered directly on the capsules, it was found that adding an intervening $SiO_2$ layer only marginally depressed the total contrast (ΔL*) between the white and black states as compared to the stack having the ITO sputtered directly on the capsules. As shown in FIG. 9 the total contrast between white and black states for the capsule—dielectric—ITO stack was relatively flat with diminished kickback across the operating temperature range, with particularly good performance between 0° C. and 35° C., i.e., typical outdoor operating conditions. Thus, it appears that adding a thin dielectric layer between the capsule layer and the top sputtered conductor can bring the overall electrophoretic medium performance into a regime suitable for outdoor signage.

Example 4

A very thin (~25 μm) eReader stack was created by combining capsule spraying with ITO sputtering. As shown in FIGS. 10A-C, a standard 6" thin-film-transistor (TFT) substrate 710 including 1448×1072 electrodes and an image controller bonded to the substrate (Innolux Corporation) was cleaned with isopropanol and dried. A monolayer of electrophoretic display capsules 720, including oppositely-charged black and white pigments was sprayed directly onto the pixel electrodes of the backplane using the techniques described above. Next approximately 100 nm of ITO 740 was deposited directly atop the sprayed capsules at a reduced ambient pressure to create a top transparent electrode 750. Atop plane connection (T.P.C.) was then fashioned between a top-plane drive electrode on the substrate 710 and the top transparent electrode 750 with a thin silver wire 780, thereby allowing the driver chip to have a reference voltage for the top transparent electrode 750. A flex connector (not shown in FIGS. 10A-10C) provided an interface between the backplane and a commercial eReader controller (Freescale Electronics). With no additional coatings, and no modification to the drive electronics, the assembled display was able to display sharp text, and effortlessly switch between pages. (The kickback was noticeable with each page turn, however.) The resulting display functioned for several weeks before showing areas of non-switching, likely due to contraction of the capsule layer due to desiccation and the subsequent cracking of the ITO layer, which diminished the electrical integrity of the top transparent electrode 750.

Thus, as described herein, it is clear that the electro-optic performance of standard encapsulated electrophoretic media is improved by directly coating the capsules with a thin film of a light-transmissive conductive material. Additionally, if the capsules are applied, e.g., with spray coating or dip coating, it is unnecessary to use lamination equipment to complete the construction of an electrophoretic display. Furthermore, such techniques can be used to create electrophoretic displays with complex shapes, provided that the thin clear electrode layer can be applied evenly to the surface.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method of making an electrophoretic display layer comprising:
   providing a first substrate;
   depositing a layer of capsules comprising electrophoretic media on the first substrate, thereby creating a contoured surface of the layer of capsules on the side of the layer of capsules opposite to the first substrate;
   depositing a dielectric layer on the contoured surface of the layer of capsules comprising electrophoretic media; and
   depositing a layer of light-transmissive conductive material over the dielectric layer previously deposited on the contoured surface of the layer of capsules.

2. The method of claim 1, wherein depositing a layer of light-transmissive conductive material takes place at a vacuum pressure of less than 133 Pascal (1 Torr).

3. The method of claim 1, wherein depositing is done with a chemical vapor deposition process.

4. The method of claim 3, wherein indium tin oxide or zinc oxide is deposited as the light-transmissive conductive layer.

5. The method of claim 1, wherein the dielectric layer comprises $Si_3N_4$, $SiO_2$, $Al_2O_3$, $HFO_2$, $ZrO_2$, or a polymer.

6. The method of claim 1, wherein the electrophoretic media comprises at least one type of charged particle that moves within the capsule in response to an applied electric field.

7. The method of claim 1, wherein the layer of capsules additionally comprises a polyurethane binder between at least some of the capsules within the layer of capsules.

8. The method of claim 1, wherein the first substrate is a release sheet.

\* \* \* \* \*